Figure 3:
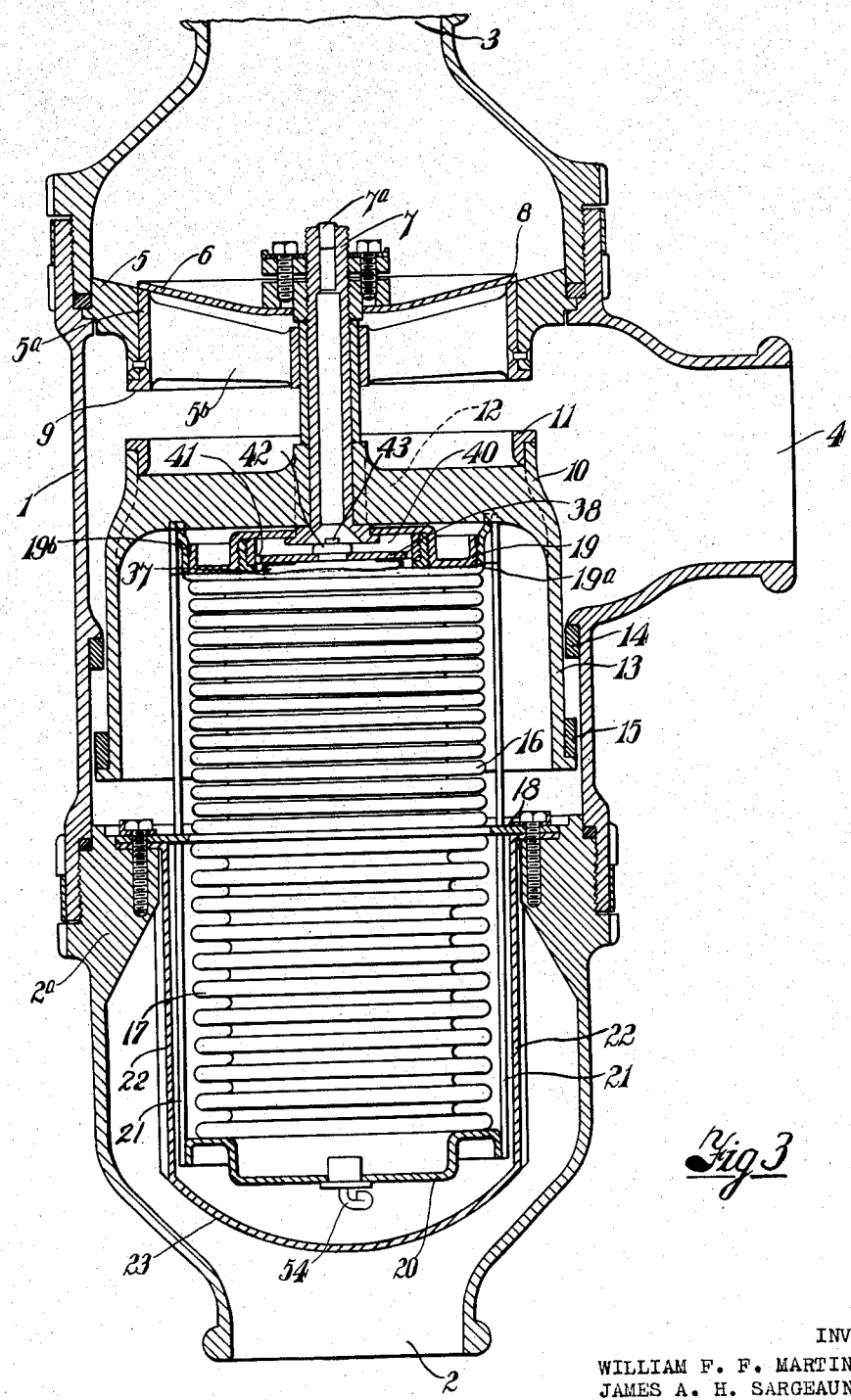

May 28, 1940.  W. F. F. MARTIN-HURST ET AL  2,202,705
TEMPERATURE CONTROL DEVICE FOR INTERNAL COMBUSTION ENGINES
Filed Sept. 6, 1938  3 Sheets-Sheet 1
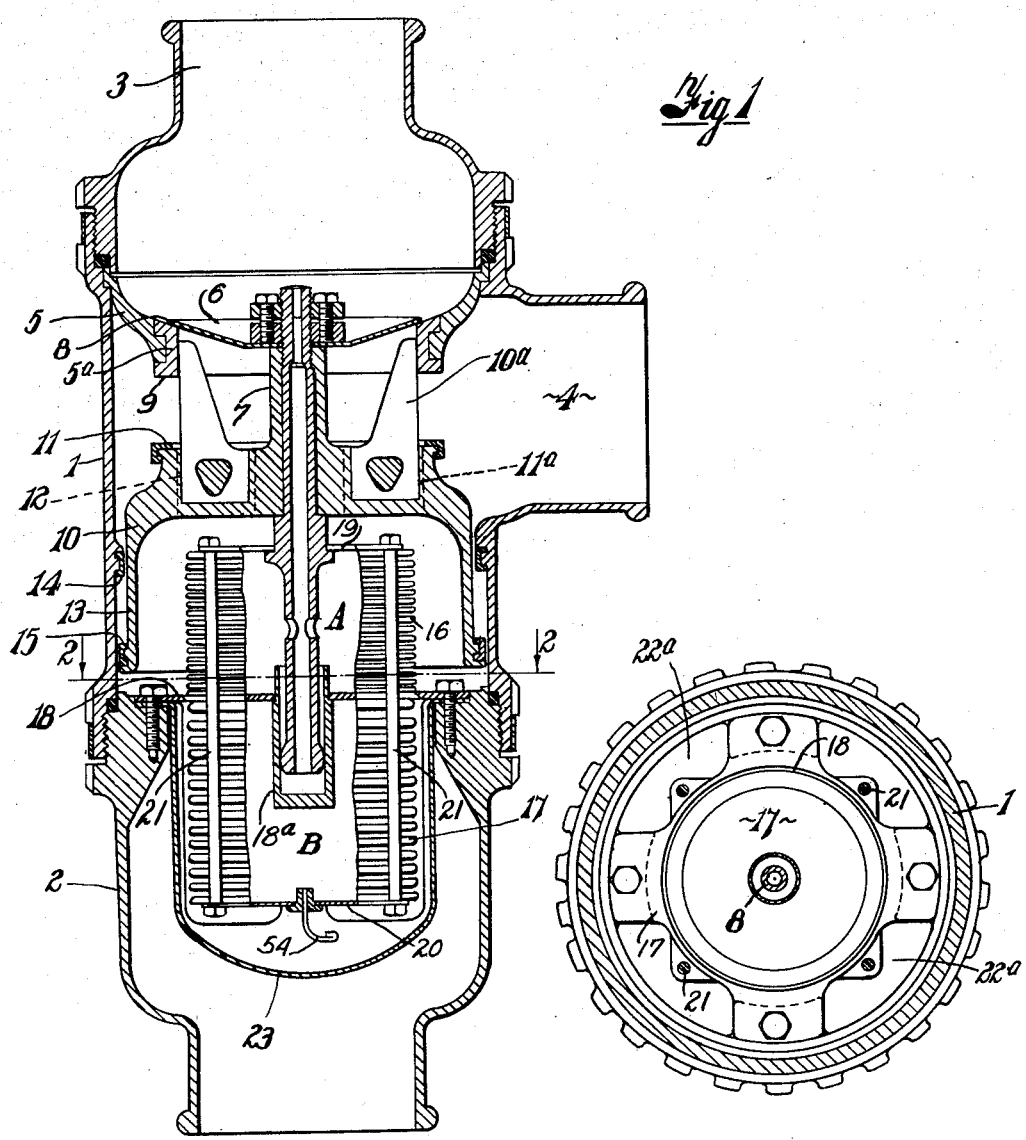
INVENTORS
WILLIAM F. F. MARTIN-HURST
JAMES A. H. SARGEAUNT
BY
ATTORNEYS INVENTORS
WILLIAM F. F. MARTIN-HURST
JAMES A. H. SARGEAUNT
BY Norris & Bateman
ATTORNEYS May 28, 1940. W. F. F. MARTIN-HURST ET AL 2,202,705
TEMPERATURE CONTROL DEVICE FOR INTERNAL COMBUSTION ENGINES
Filed Sept. 6, 1938 3 Sheets-Sheet 3

INVENTORS
WILLIAM F. F. MARTIN-HURST
JAMES A. H. SARGEAUNT
BY Norris & Bateman
ATTORNEYS Patented May 28, 1940

2,202,705

UNITED STATES PATENT OFFICE 2,202,705

TEMPERATURE CONTROL DEVICE FOR INTERNAL COMBUSTION ENGINES

William Frederick Forrest Martin-Hurst and James Antony Hosking Sargeaunt, Sunbury-on-Thames, England, assignors to The British Thermostat Company Limited, Sunbury-on-Thames, England, a company of Great Britain Application September 6, 1938, Serial No. 228,648
In Great Britain October 6, 1937

13 Claims. (Cl. 236—34)

This invention relates to temperature regulating apparatus for the cooling systems of internal combustion engines and more particularly to apparatus of the kind which depends for its operation upon the variation with temperature of the vapour pressure of a volatile liquid confined in a sealed chamber. The said sealed chamber (hereinafter referred to as the temperature-sensitive chamber) is filled partly with liquid and partly with vapour and the pressure of the vapour is transmitted, through the medium of a flexible sealing member such as a flexible metal bellows to a regulating device which controls the efficiency of the cooling system.

The invention has particular but not exclusive reference to thermostatic valve mechanism adapted to regulate the circulation of engine cooling liquid and comprising a temperature-sensitive chamber in the form of an expansible metal bellows immersed in the cooling liquid.

One object of the invention is to provide an improved thermostatic valve mechanism adapted to regulate the circulation of aero-engine cooling liquid and comprising a temperature sensitive expansible metal bellows immersed in the cooling liquid and a compensating bellows mechanically coupled to the temperature sensitive bellows so that the compensating bellows is compressed when the temperature sensitive bellows expands, the whole of this mechanism being compactly arranged in a valve casing and in such a way as to provide a through passage for cooling liquid. The compensating bellows acts in such a way that the temperature regulation is not interfered with by the fall of external air pressure which occurs at high altitudes.

Another object of the invention is to provide a safety device adapted to prevent overheating of the engine in the event of failure of a thermostatic control device due to rupture of a flexible sealing member and consequent loss of pressure in an expansible chamber of the thermostatic control mechanism.

As heretofore constructed, temperature regulating devices operating upon the principle described above have been subject to the limitation that the working pressure of the vapour in the temperature sensitive chamber cannot be made greater than the pressure outside the chamber without risk of dangerous overheating of the engine in the event of failure of the bellows or other flexible sealing member. If the working pressure inside the temperature sensitive chamber is higher than the pressure outside, failure of the sealing member allowing equalisation of pressure on opposite sides of the latter causes the regulating device to move to a position in which the efficiency of the cooling system is seriously impaired with the result that the engine cannot continue to operate without serious risk of overheating. The low working pressures thus enforced by considerations of safety increase the bulk of the apparatus required to effect a given degree of control and thus render it difficult to apply the device to aero-engines.

A similar difficulty arises when an attempt is made to compensate for variations of atmospheric pressure by the provision of a control chamber either evacuated or charged with air and coupled to the temperature sensitive chamber in such a way that the control chamber is compressed when the temperature sensitive chamber expands. With such an arrangement, if the working pressure in the temperature sensitive chamber is made lower than the normal atmospheric pressure and the control chamber is partly evacuated, failure of the control chamber allowing equalisation of pressure inside and outside the control chamber will bring about the dangerous condition above mentioned. Alternatively, if the working pressure inside the temperature sensitive chamber is made higher than the normal atmospheric pressure, the same danger will arise in the event of escape of pressure fluid from the temperature sensitive chamber.

According to the present invention, temperature regulating apparatus operating on the principle hereinbefore described is arranged so that failure of a flexible sealing member tending to expose the engine to risk of overheating causes the release of a safety device which prevents any dangerous impairment of the efficiency of the cooling system.

The safety device preferably comprises a spring normally held in compression by a latch mechanism controlled by an auxiliary temperature sensitive device arranged so that, in the event of failure of the temperature regulating device, the auxiliary temperature sensitive device operates the latch mechanism with the result that the aforesaid spring is released and moves the temperature sensitive device to a position in which the engine cooling system works substantially at its maximum efficiency.

According to the preferred form of the invention, the apparatus comprises a temperature sensitive chamber containing a volatile liquid having a boiling point lower than the normal working temperature and a safety device consisting of a spring located inside the temperature sensitive chamber and held in compression by a latch mechanism controlled by a small auxiliary temperature-sensitive chamber enclosed within the main temperature-sensitive chamber, the space inside the small chamber and the space outside the latter and within the main chamber both containing the same volatile liquid and vapour. This arrangement prevents the auxiliary chamber from expanding and operating the latch mechanism so long as the main temperature sensitive chamber is intact.

The control force necessary to prevent the expansion of the temperature sensitive chamber until the proper temperature is reached may be provided by means of a control spring. It is preferred, however, to provide an expansible control chamber charged with air under pressure and coupled to the temperature sensitive chamber so that the air charged chamber is compressed when the temperature sensitive chamber expands. In this way, variations of atmospheric pressure can be compensated for so that the temperature regulation will not be upset by changes of altitude.

According to a preferred form of the invention as applied to a device fitted with an air charged control chamber, the safety device is adapted to puncture the control chamber and thereby release the control force in the event of failure of the temperature control chamber. The advantage of this arrangement is that it enables the safety device to function without having to overcome the control force. The safety device can therefore be made smaller than would be possible if the control chamber were left intact after failure of the temperature sensitive chamber.

Figure 4:
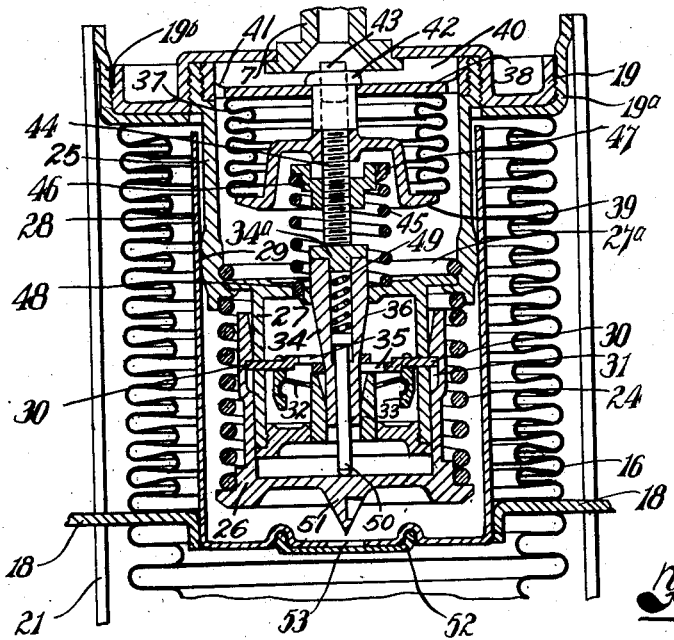
Figure 5:
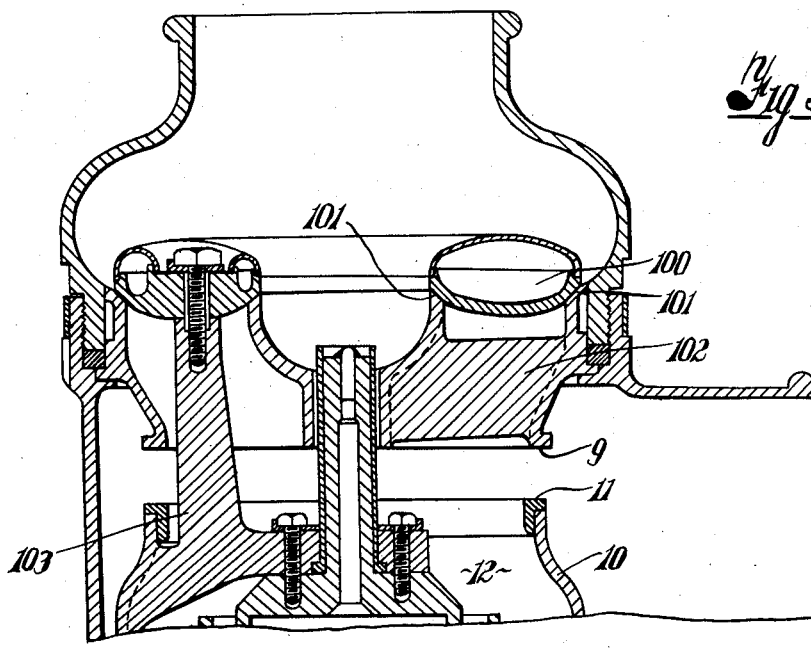

The invention will be more easily understood from the following description with reference to the accompanying drawings in which:

Figure 1 is a sectional view of a thermostatic valve mechanism constructed according to one form of the invention, Figure 2 is a section on the line 2—2 of Figure 1, Figure 3 is a sectional view similar to Figure 1 but showing a modified construction, Figure 4 is an enlarged detail view of a safety device embodied in the mechanism shown in Figure 3 and adapted to ensure movement of the valves to the position for maximum efficiency of cooling system in the event of failure of a metal bellows and Figure 5 is a detail view showing a modified construction of valve having a large effective opening.

Referring first to Figures 1 and 2 of the drawings, the numeral 1 represents the body of a valve casing fitted with an inlet connection 2, a main outlet connection 3 and an auxiliary or by-pass outlet connection 4. The inlet 2 and main outlet 3 are intended to be connected to the engine cooling jacket and radiator in such a way that the hot water or other cooling liquid coming from the engine cooling jacket passes through the body 1 on its way to the radiator. The auxiliary or by-pass outlet connection 4 is intended to be connected to a by-pass conduit so arranged that cooling liquid delivered to the outlet connection 4 is returned to the engine cooling jacket without passing through the radiator.

The outlet connection 3 is externally threaded to engage an internal screw thread formed in one end of the body 1 and serves to secure an annular member 5 seated against an annular shoulder in the body 1 and forming a valve-controlled opening through which the interior of the body 1 communicates with the outlet 3. The valve 6 which controls this opening consists of a sheet metal disc secured to a valve stem 7. The annular member 5 is fitted with an annular lining 5a which forms a seating 8 for the valve 6, and which also forms a seat 9 for an annular valve member 10 secured to the stem 7 and having a seat 11 arranged to close against the seat 9. The valve member 10 is constructed with openings indicated at 12 between the seat 11 and the stem 7 so that liquid entering the casing 1 through the inlet 2 can flow freely through these openings into the space between the valve members 6 and 10.

When the parts are in the position shown in the drawings, all the liquid which flows through the above mentioned openings into the space between the valve members 6 and 10 escapes to the outlet 4 through the annular gap between the parts 11 and 9. When the valve stem 7 is lifted however, the valve 6 is gradually lifted from its seat 8 so as to permit liquid to escape to the main outlet 3 and at the same time the valve member 10 is gradually closed against its seat 9 so as to cut off the flow to the outlet 4. As shown in the drawings, the valve member 11 has a skirt 13 whose external surface lies close to the internal surface of the wall of the casing 1 so that the skirt 13 prevents any considerable leakage of fluid from the interior of the casing 1 to the outlet 4 round the outside of the valve member 10. An internal annular seating 14 is formed on the wall of the casing 1 and an external annular seating 15 formed at the bottom of the skirt 13 is arranged to close against the seating 14 when the valve stem 7 is lifted, the arrangement being such that the two pairs of seatings 9, 10 and 14, 15 close simultaneously so as completely to prevent the escape of liquid to the outlet 4 when the stem 7 is in its fully raised position.

The valve stem 7 and the valve members 6 and 10 carried thereby are guided partly by the engagement of horns or projections 10a on the member 10 in the opening controlled by the valve 6 and partly by the engagement of the lower end of the valve stem 7 in a tubular guide 18a fixed to a plate 18 secured to the inlet member 2.

The plate 18 carries two flexible metal bellows 16 and 17 disposed on opposite sides of the plate 18 and soldered or otherwise secured to the plate 18 so that each bellows is closed at one end by the said plate. The upper bellows 16 is closed at its upper end by a metal plate 19 which is secured to the stem 7 so that the bellows 16 expands and contracts with the upward and downward movement of the stem 7. The bellows 17 is closed at its lower end by a plate 20 and the plate 20 is tied to the plate 19 by means of rods 21 which are disposed outside the metal bellows 16 and 17 and which pass freely through openings 22a provided between the plate 17 and the wall of the inlet member 2 (see Figure 2). Liquid can flow freely from the inlet 2 through the space between the bellows devices 16 and 17 and the walls of the casing 1 (by way of the openings 22a and thence through the openings 12 in the valve member 10 to the space between the valves 6 and 10.

The part 23 is a metal shield which protects the bellows 19 from the direct force of the stream of liquid entering through the member 2. It will be seen from the drawings that the valve 6 is detachable from the stem 7 and that when the valve 6 is detached the inlet member 2 can be unscrewed and removed from the body 1 carrying with it the plate 18, bellows 16 and 17, valve stem 7 and valve member 10.

It will also be seen from the drawings that the lower end of the tubular guide member 18a is closed at its lower end so that the two expansible chambers A and B formed by the bellows 16 and 17 are completely separate and distinct from one another, though they are coupled together by means of the rods 21.

The chamber A is charged with a quantity of volatile liquid and the chamber B is filled with air so that the pressure on the plate 19 due to the vapour pressure of the volatile liquid tends to open the valve 6 (and at the same time to close the valve 10) against the control force provided by the pressure of air in the chamber B. In the construction shown in the drawings, the volatile liquid is introduced into the chamber through the valve stem 7 which is suitably bored for this purpose, the bore hole being suitably plugged and sealed at the upper end of the stem 7 so as to seal the chamber A when a suitable quantity of volatile liquid has been introduced therein. Suitable liquids are ethyl alcohol, methyl alcohol and distilled water or mixtures, the choice of liquid depending on the operating temperature required. The chamber A when charged and sealed contains only the liquid and vapour of the charge selected. The plate 20 is fitted with a short vent pipe 54 which can be sealed off so as to seal the chamber B when the latter contains a suitable quantity of air.

In the operation of the mechanism, when the engine is cold the parts assume the positions shown in the drawings, so that cooling liquid delivered from the engine cooling jacket to the inlet 2 is free to flow round the bellows chambers, through the openings 12 and thence through the space between the seatings 9 and 11 to the auxiliary or by-pass outlet 4. At this time the valve 6 is completely closed and the whole of the liquid from the engine cooling jacket is therefore diverted from the radiator and returned to the engine cooling jacket through the by-pass conduit. As the temperature of the engine rises, the vapour pressure of the liquid in the chamber A rises and when this pressure exceeds the total control force due to the pressure of air in the bellows 17 and the resilience of the bellows, the chamber A begins to expand and opens the valve 7, at the same time moving the valve member 10 towards its closed position. If the temperature of the engine continues to increase the valve 6 opens wider and the valve member 10 moves nearer to its closed position so that a larger proportion of the cooling liquid coming from the engine cooling jacket is passed through the radiator. When the valve 10 is completely closed the whole of the cooling liquid passes through the radiator. It will be obvious that more or less of the cooling liquid will be diverted from the radiator according as the temperature of the engine is lower or higher and that this control will have a temperature regulating effect tending to minimise variations of working temperature.

Owing to the fact that the chambers A and B act in opposition the forces due to the external fluid pressure acting on these two chambers are equal and opposite. The effects of variations of such external pressure are therefore compensated or balanced out. The use of air charged bellows 17 thus compensates entirely for the changes in atmospheric pressure arising from the use of the thermostat at varying altitudes and the temperature at which the valve 6 begins to open remains constant.

Referring now to Figures 3 and 4 of the drawings, the reference numeral 1 indicates as before the body of a valve casing fitted with an inlet connection 2 intended to be connected to an outlet from the engine cooling jacket and a main outlet connection 3 intended to be connected to the radiator. The body 1 is formed with an auxiliary outlet connection 4 which is intended to be connected to a by-pass conduit so arranged that cooling liquid delivered to the connection 4 is returned to the engine cooling jacket without passing through the radiator.

The outlet connection 3 is externally threaded to engage an internal screw thread formed in one end of the body 1 and serves to secure an annular member 5 seated against an annular shoulder in the body 1 and forming a valve controlled opening through which the interior of the body 1 communicates with the outlet 3. This opening is controlled by a valve 6 consisting of a sheet metal disc secured to a valve stem 7. The annular member 5 is fitted with an annular lining 5a which forms a seating 8 for the valve 6 and which also forms a seat 9 for an annular valve member 10 fixed to the stem 7 and having a seat 11 arranged to close against the seat 9. The valve stem 7 is guided by means of a spider 5b carried by the lining 5a.

The valve member 10 is constructed with openings indicated at 12 between the seat 11 and the stem 7 so that the liquid entering the casing through the inlet 2 can flow freely through these openings into the space between the valve members 6 and 10.

When the parts are in the position shown in the drawings all the liquid which flows through the above mentioned openings into the space between the valve members 6 and 10 escapes to the outlet 4 through the annular gap between the seatings 9 and 11. When the valve stem 7 is lifted, however, the valve 6 is gradually lifted from its seat 8 so as to permit liquid to escape to the main outlet 3 and at the same time the valve member 10 is gradually closed against the seat 9 so as to cut-off the flow to the outlet 4. As shown in the drawings the valve member 10 has a skirt 13 whose external surface lies close to the internal surface of the wall of the casing 1, so that the skirt 13 prevents any considerable leakage of fluid round the outside of the valve member 10 from the interior of the casing 1 to the outlet 4. An internal annular seating 14 is formed on the wall of the casing 1 and an external annular seating 15 formed at the bottom of the skirt 13 is arranged to close against the seating 14 when the valve stem 7 is lifted. The arrangement is such that the two pairs of seatings 9, 11 and 14, 15 close simultaneously so as completely to prevent the escape of liquid to the outlet 4 when the stem 7 is in its fully raised position.

The valves 6 and 10 are controlled by two flexible metal bellows 16 and 17 mounted coaxially on opposite sides of a supporting plate 18 in the form of a disc having radially projecting parts fixed to inwardly projecting lugs 2a on the member 2. The bellows are soldered or otherwise secured to the plate 18 so that each bellows is closed at one end by the said plate. The upper bellows 16 is soldered or otherwise secured at its upper end to a ring 19a secured to a plate 19 which closes the end of the bellows. The stem 7 is of hollow tubular construction and is secured at its lower end in a central opening in the plate 19 so that the bellows 16 can be charged through the stem 7 as hereinafter described.

The lower bellows 17 is closed at its lower end by a plate 20 which is tied to the ring 19a by means of a number of strips or rods 21. The rods 21 are disposed outside the metal bellows 16 and 17 and pass freely through spaces provided for them between the plate 18 and the body 1. These rods transmit the movements of the plate 19 and ring 19a to the plate 20 so that when the bellows 16 expands, the bellows 17 is compressed. The spaces between the plate 18 and the body 1 also provide for the flow of cooling liquid so that this liquid can flow freely from the inlet 2 through the space between the bellows 16, 17 and the walls of the casing 1 and through the openings 12 to the space between the valves 6 and 10. A sheet metal guard 22 for the bellows 17 is fixed to the inlet member 2. This guard is formed with a part 23 adapted to protect the bellows from the force of the stream of cooling fluid entering the inlet member 2. As will be seen from the drawings, the valve member 6 is detachable from the stem 7 so that when the valve 6 is detached the inlet member 2 can be unscrewed and removed from the body 1 carrying with it the plate 18, bellows 16 and 17, valve stem 7 and valve member 10.

Mounted inside the bellows 16 is a safety device comprising a spring 24 (see Figure 4) which bears at one end against a tubular member 25 fixed to the plate 19 and at the other end against a hollow plunger 26 mounted to slide on a tubular part 27 fixed to the open end of the tubular member 25 and projecting downwardly therefrom towards the fixed plate 18. The parts 27 and 25 are held tightly together by a spring ring 27a. Thus relative rotation may be effected between these two parts.

The parts 24, 25, 26 and 27 are enclosed in a tubular casing 28 fixed in a central opening in the plate 18. The bottom end of this casing 28 is normally closed so as to prevent communication between the bellows 16 and 17. The tubular casing 28 acts as a guide for the tubular member 25, the latter being formed with an annular protuberance 29 which fits the internal walls of the casing 28 so as to be slidable therein.

In the position of the parts shown in the drawings, the spring 24 is compressed and the part 26 is locked in position by means of two keys 30 which are mounted to slide in openings cut through the walls of the part 27. These keys 30 are urged radially outwards and into engagement with an annular recess 31 in the part 26 by means of a bow-spring 32 which bears at is opposite ends against lugs 33 fixed to the keys 30.

The keys 30 are adapted to be retracted against the action of the spring 32 by means of a sliding bolt 34 supported in suitable guides in the member 27 and projecting through openings 35 formed in the keys 30, these openings being formed in parts of the keys which overlap one another as shown. The bolt 34 has a conical shoulder 36 so arranged that when the bolt is driven downwards the conical shoulder 36 passes through the openings 35 and draws the keys 30 inwards against the action of the spring 32, thereby releasing the keys from engagement with the recess 31.

The bolt 34 is controlled by an auxiliary temperature sensitive device comprising a small flexible metal bellows 37 mounted in the tubular member 25. The bellows 37 is closed at one end by a plate 38 fixed to the plate 19 and at the other end by a plate 39. The plate 38 is spaced from the plate 19 so as to provide a space 40 communicating with the tubular stem 7.

The space 40 communicates with the interior of the tubular member 25 and thence with the space inside the bellows 16 through openings 41 formed in the plate 38 outside the bellows 37. The space 40 may also be made to communicate with the interior of the bellows 37 through a short tubular member 42 fixed in an opening in the plate 38 in alignment with the tubular stem 7. The opening through the member 42 is used to charge the bellows 37 in a manner hereinafter to be described. In the completed instrument, however, the opening through the member 42 is closed by a plug 43.

The plate 39 carries a push rod 44 which projects downwards from the plate 39 and engages the bolt 34. The plate 39 is normally pressed against the end of the member 42 by the action of a spring 45 which bears at one end against the member 27 and at the other end against an adjusting nut 46 mounted on the push rod 44, the push rod 44 being externally screw threaded for engagement with the internal screw threads of the nut 46. The ends of the spring 45 are bent at right angles and engage in recesses in the part 27 and nut 46 respectively, as indicated at 47 and at 48, so that the spring holds the nut 46 against accidental rotation on the push rod 44.

The bolt 34 contains a light spring 49 which bears at one end against a cap 34a which is pressed into the bolt and at the other end against a plunger 50 which projects from the end of the bolt and abuts against the bottom of the hollow plunger 26. This spring holds the bolt 34 firmly in engagement with the push rod 44 and prevents rattle.

The part 26 carries a spike 51 capable, under the action of the spring 24, of perforating a diaphragm 52 carried on the bottom of the casing 28. This diaphragm normally covers an opening 53 through which the spike 51 is driven when the spring 24 expands. So long as the diaphragm 52 is intact there is no communication between the interiors of the bellows 16 and 17.

The plate 20 is fitted with a short vent pipe 54 through which the bellows 17 is charged with dry air under pressure, this vent pipe being sealed off by flattening and soldering so as to retain the requisite quantity of air within the bellows 17.

In assembling the apparatus, the charging of the bellows 37 and the adjustment of the tension of the spring 45 are effected before the tubular member 25 and the parts carried thereby have been inserted into the bellows 16 and while the plate 19 is detached from the parts 25 and 19a. When the bellows 37 has been charged and sealed by means of the plug 43, the tension of the spring 45 is adjusted. This is effected by rotating the tubular part 27 and thereby rotating the nut 46 on the rod 44 so as to increase or diminish the tension of the springs 45. The spring tension is set so that the bellows 37 will expand against the action of the spring when the temperature reaches the normal working level.

The tubular member 25 with all the parts carried thereby correctly assembled and adjusted is now screwed into the plate 19 and the latter is then screwed to the ring 19a to which the bellows 16 has previously been soldered. The screw threaded joint between the parts 19 and 19a is sealed by the application of solder as indicated at 19b on the drawings.

On completion of the assembly the bellows 16 is charged and the stem 7 is plugged and sealed at its upper end as shown at 7a. Finally the bellows 17 is charged with air under pressure and sealed by flattening and soldering the vent pipe 54.

The bellows 37 and 16 are both charged with the same volatile liquid and the spaces inside these bellows are both only partly filled with this liquid so that there is a vapour space above the liquid in each bellows.

We use a volatile liquid such as methyl alcohol whose boiling point is below the normal working temperature of the cooling fluid which circulates round the bellows. The air-charged bellows 17 acts as a control spring and the pressure of the air therein is so adjusted as to prevent the bellows 16 from expanding and opening the valve 6 until the temperature of the cooling fluid surrounding the bellows reaches the normal working level.

In the operation of the device, when the engine is cold, the parts assume the positions shown in the drawings so that the whole of the cooling liquid delivered to the inlet opening 2 from the engine cooling jacket is diverted to the auxiliary outlet 4 and is returned to the engine cooling jacket without passing through the radiator.

As a temperature of the engine rises, the vapour pressure of the liquid inside the bellows 16 rises and when this pressure exceeds the total control force due to the pressure of the air inside the bellows 17 and the resilience of the bellows, the bellows 16 begins to expand and opens the valve 6, at the same time moving the valve member 10 towards its closed position. As the temperature of the engine continues to increase, the valve 6 opens wider and the valve member 10 moves nearer to its closed position so that a larger proportion of the cooling liquid coming from the engine cooling jacket is passed through the radiator. It will be obvious that more or less of the cooling liquid will be diverted from the radiator according as the temperature of the engine is lower or higher and that this control has a temperature regulating effect and tends to maintain the engine at uniform temperature.

Owing to the fact that the bellows 16 and 17 act in opposition, the forces due to the pressure of the atmosphere acting on these two bellows are equal and opposite. The effects of variation of atmospheric pressure are therefore compensated or balanced out so that the temperature control is not affected by variations of atmospheric pressure.

Under normal working conditions, the pressure inside the bellows 37 is equal to the pressure in the space outside the bellows 37 and within the bellows 16, since both these spaces contain the same liquid and vapour at the same temperature. Consequently, so long as the bellows 16 remains intact, the plate 39 is held against the end of the tube 42 by the action of the spring 45 and the keys 30 remain in their latching positions.

In the event of leakage from the bellows 16 and consequent failure of the thermostatic control, however, a difference of pressure is produced between the space inside the bellows 37 and the space outside this bellows. Under the action of this difference of pressure the bellows 37 expands and drives the bolt 34 downwards against the action of the spring 45 thereby retracting the keys 30 and releasing the member 26. The spring 24 then drives the member 26 downwards against the bottom of the casing 28 so that the spike 51 is driven through the diaphragm 52. The air compressed in the bellows 17 escapes through the perforated diaphragm 52 into the interior of the bellows 16 and the pressure in these two bellows is equalised, and falls to the pressure outside the bellows. At the same time the pressure of the spring 24 against the tubular member 25 pushes the plate 19 upwards so that the valve 6 is moved to the open position. In this way, the circulation of cooling fluid through the engine cooling jacket is maintained and damage due to overheating of the engine in the event of failure of the thermostatic control is obviated.

Figure 5 of the drawings shows a modified form of valve which has a greater effective opening than the valve 6 shown in Figure 1. The valve shown in Figure 2 consists of a hollow annular body 100 adapted to seat upon two concentric seatings 101 formed on a part 102 which takes the place of the part 5a of Figure 1. The part 102 is shaped to provide an annular opening between the seats 101 so that when the valve member 100 is lifted the liquid flows outwards over the outer valve seating 101 and also inwards over the inner valve seating 101. The effective valve opening is thus substantially increased as compared with that of a single disc valve of the same diameter and stroke. The part 102 is also formed with a seat 9 which serves the same purpose as the seat 9 of Figure 1. The valve member 100 is attached to the valve member 10 by means of three posts which project upwards from the valve member 10 and through the annular valve opening provided in the part 102. One of these posts can be seen at 103 in Figure 5.

We claim:

1. A temperature regulating device for the cooling system of an internal combustion engine having a passageway for the flow of a cooling fluid and a valve controlling the flow of said fluid therein, comprising temperature sensitive means subject to the temperature of the cooling fluid in said passageway and connected to said valve and operative by fluid pressure in response to a rise in temperature of said cooling fluid to open said valve, normally inactive auxiliary means connected to said valve for opening it, and means responsive to an abnormal drop in pressure of the operating fluid of said temperature sensitive means for rendering said auxiliary means operative to open the valve.

2. A temperature regulating device for the cooling system of an internal combustion engine having a passageway for the flow of a cooling fluid and a valve controlling the flow of said fluid therein, comprising temperature sensitive means subject to the temperature of the cooling fluid in said passageway and connected to said valve and operative by fluid pressure in response to a rise in temperature of said cooling fluid to open said valve, auxiliary means to act on said valve to open it, retaining means for normally restraining the valve opening action of said auxiliary means, and means operable in response to an abnormal drop in pressure of the operating fluid of said temperature sensitive means for releasing said retaining means.

3. A temperature regulating device for the cooling system of an internal combustion engine having a passageway for the flow of a cooling fluid and a valve controlling the flow of said fluid therein, comprising temperature sensitive means subject to the temperature of the cooling fluid in said passageway and connected to said valve and having an operating fluid responsive to a rise in temperature of said cooling fluid to open said valve, means tending to close said valve, and means rendered operative by an abnormal drop in pressure of the operating fluid of said temperature sensitive means for rendering said valve closing means ineffective.

4. A temperature regulating device for the cooling system of an internal combustion engine having a passageway for the flow of a cooling fluid and a valve controlling the flow of said fluid therein, comprising a temperature sensitive element subject to the temperature of the cooling fluid in said passageway and connected to said valve and having an operating fluid responsive to a rise in temperature of said cooling fluid to open said valve, means tending to close said valve, auxiliary means to act on said valve to open it and to render said valve closing means ineffective, retaining means for normally restraining said auxiliary means, and means operable in response to abnormal drop in pressure of the operating fluid of said temperature sensitive element for releasing said retaining means.

5. A temperature regulating device for the cooling system of an internal combustion engine having a passageway for the flow of a cooling fluid and a valve controlling the flow of said fluid therein, comprising a temperature sensitive element subject to the temperature of the cooling fluid in said passageway and connected to said valve and containing a volatile fluid which is expansive in response to a rise in temperature of the cooling fluid to produce an increased pressure in the temperature sensitive element and thereby open said valve, auxiliary means for opening said valve, and means operative in response to an abnormal drop in pressure in the temperature sensitive element for rendering the auxiliary valve opening means effective.

6. A temperature regulating device comprising an element having a temperature sensitive fluid for operating it, a regulating member movable in one direction by said element, an auxiliary element to act on said regulating member to move it in said direction, retaining means including a controlling latch for restraining said auxiliary element, and an auxiliary temperature sensitive element operative to trip said latch in response to an abnormal drop in pressure of the fluid of the first mentioned temperature sensitive element.

7. A temperature regulating device comprising an element having a temperature sensitive fluid for operating it, a regulating member movable in one direction by the temperature sensitive fluid of said element, an opposing element acting to move said regulating member in another direction, means including a controlling latch for rendering said opposing element ineffective, and an auxiliary temperature sensitive element operative in response to an abnormal drop in pressure of the temperature sensitive fluid of the first mentioned element to trip said latch.

8. A temperature regulating device comprising an element having a temperature sensitive fluid for operating it, a regulating member movable in one direction by said element, an auxiliary element to act on said regulating member to move it in said direction, an opposing element acting to move said regulating member in the opposite direction, means operative by said auxiliary element to render said opposing element ineffective, retaining means including a controlling latch for restraining said auxiliary element, and an auxiliary temperature sensitive element having means for rendering it operative in response to an abnormal drop in pressure of the operating fluid of the first mentioned element to trip said latch.

9. A temperature regulating device comprising a flexible bellows containing a volatile fluid, a regulating member connected to said bellows and movable thereby in one direction by an increase of pressure of the fluid therein in response to a rise in temperature, an auxiliary element for moving the regulating means in the same direction, means normally restraining said auxiliary element from operation, and an auxiliary volatile fluid containing flexible bellows contained within the first mentioned bellows and operative in response to an abnormal drop in pressure therein to release said auxiliary element for operation.

10. A temperature regulating device comprising a flexible bellows containing a volatile fluid, a regulating member connected to said bellows and movable thereby in one direction by an increase of pressure of the fluid therein in response to a rise in temperature, an opposing element acting to move the regulating member in the opposite direction, and an auxiliary volatile fluid containing flexible bellows contained within the first mentioned bellows and operative in response to an abnormal drop in pressure therein to render said opposing element ineffective.

11. A temperature regulating device comprising a regulating member, a pair of sealed bellows connected to one another and to said member, one of said bellows containing a volatile fluid and acting by a variation of pressure of said fluid to move said member in one direction and the other bellows acting to move said member in the opposite direction, auxiliary means for moving said member in the first mentioned direction, and means operative in response to an abnormal change in pressure in one of said bellows for rendering operative said auxiliary means.

12. A temperature regulating device comprising a flexible bellows containing a volatile fluid, a regulating member connected to said bellows and movable thereby in one direction by an increase of pressure of the fluid therein in response to a rise in temperature, an auxiliary element for moving the regulating member in the same direction, an opposing element acting to move the regulating member in the opposite direction, releasable means for rendering said auxiliary element operative and for rendering said opposing element ineffective including a volatile fluid containing auxiliary bellows located within the first mentioned bellows and operative in response to an abnormal drop in pressure therein for releasing said releasable means.

13. A temperature regulating device comprising a flexible bellows containing a volatile fluid, a regulating member connected to said bellows and movable thereby in one direction by an increase of pressure of the fluid therein in response to a rise in temperature, a sealed flexible control bellows acting on the regulating member to move it in the opposite direction, a spring for moving the regulating member in the first mentioned direction, a restraining member for normally holding said spring inactive and having means operative thereby under the action of the spring to puncture said control bellows, a latch for controlling said restraining member, and means operative in response to an abnormal drop in pressure in the first mentioned bellows to operate said latch to release said restraining member for operation of said puncturing means and to render the spring operative upon the regulating member.

WILLIAM FREDERICK FORREST
        MARTIN-HURST.
JAMES ANTONY HOSKING SARGEAUNT.